United States Patent
Takagi et al.

(10) Patent No.: US 11,651,288 B2
(45) Date of Patent: May 16, 2023

(54) LEARNING DATA GENERATION APPARATUS, CHANGE AREA DETECTION METHOD AND COMPUTER PROGRAM

(71) Applicant: NIPPON TELEGRAPH AND TELEPHONE CORPORATION, Tokyo (JP)

(72) Inventors: Motohiro Takagi, Musashino (JP); Kazuya Hayase, Musashino (JP); Tokinobu Mitasaki, Musashino (JP); Atsushi Shimizu, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 294 days.

(21) Appl. No.: 17/046,227

(22) PCT Filed: Apr. 5, 2019

(86) PCT No.: PCT/JP2019/015108
§ 371 (c)(1),
(2) Date: Oct. 8, 2020

(87) PCT Pub. No.: WO2019/198634
PCT Pub. Date: Oct. 17, 2019

(65) Prior Publication Data
US 2021/0042963 A1 Feb. 11, 2021

(30) Foreign Application Priority Data
Apr. 12, 2018 (JP) .............................. JP2018-077109

(51) Int. Cl.
*G06T 7/00* (2017.01)
*G06T 7/11* (2017.01)
(Continued)

(52) U.S. Cl.
CPC ............... *G06T 7/97* (2017.01); *G06N 20/00* (2019.01); *G06T 5/50* (2013.01); *G06T 7/11* (2017.01)

(58) Field of Classification Search
CPC ..... G06T 7/97; G06T 5/50; G06T 7/11; G06T 7/25; G06N 20/00; G06V 10/44;
(Continued)

(56) References Cited

U.S. PATENT DOCUMENTS

2018/0253424 A1* 9/2018 Banerjee ............... G06T 7/0002

FOREIGN PATENT DOCUMENTS

| AU | 2015376657 B2 * | 3/2017 | ........... G06K 9/0063 |
| JP | 2019533180 A * | 11/2019 | ............. G06N 20/00 |

OTHER PUBLICATIONS

Nicolas Champion, "2D Building Change Detection From High Resolution Aerial Images and Correlation Difital Surafce Models," Sep. 2007, 197-202 (Year: 2007).*

(Continued)

*Primary Examiner* — Sean M Conner
*Assistant Examiner* — Phuong Hau Cai

(57) ABSTRACT

A learning data generation device of an embodiment includes a detection unit that detects a changed region in a space between a first map and a second map based on first map data which indicate the first map and second map data which indicate the second map which indicates a substantially same space as the first map and represents the space at a different time point from the first map and a changed region image acquisition unit that acquires images which correspond to the changed region detected by the detection unit from a first image in which the space represented by the first map is captured and a second image in which the space represented by the second map is captured.

12 Claims, 10 Drawing Sheets

(51) Int. Cl.
*G06N 20/00* (2019.01)
*G06T 5/50* (2006.01)

(58) Field of Classification Search
CPC .. G06V 10/751; G06V 10/759; G06V 20/176; G03B 15/00; G09B 29/00
See application file for complete search history.

(56) References Cited

OTHER PUBLICATIONS

Machine Translation, JP2019533180A (Year: 2019).*
J. Tang, et al. "Compressed-Domain Ship Detection on Spaceborne Optical Image Using Deep Neural Network and Extreme Learning Machine," in IEEE Transactions on Geoscience and Remote Sensing, vol. 53, (2015), pp. 1174-1185.

* cited by examiner

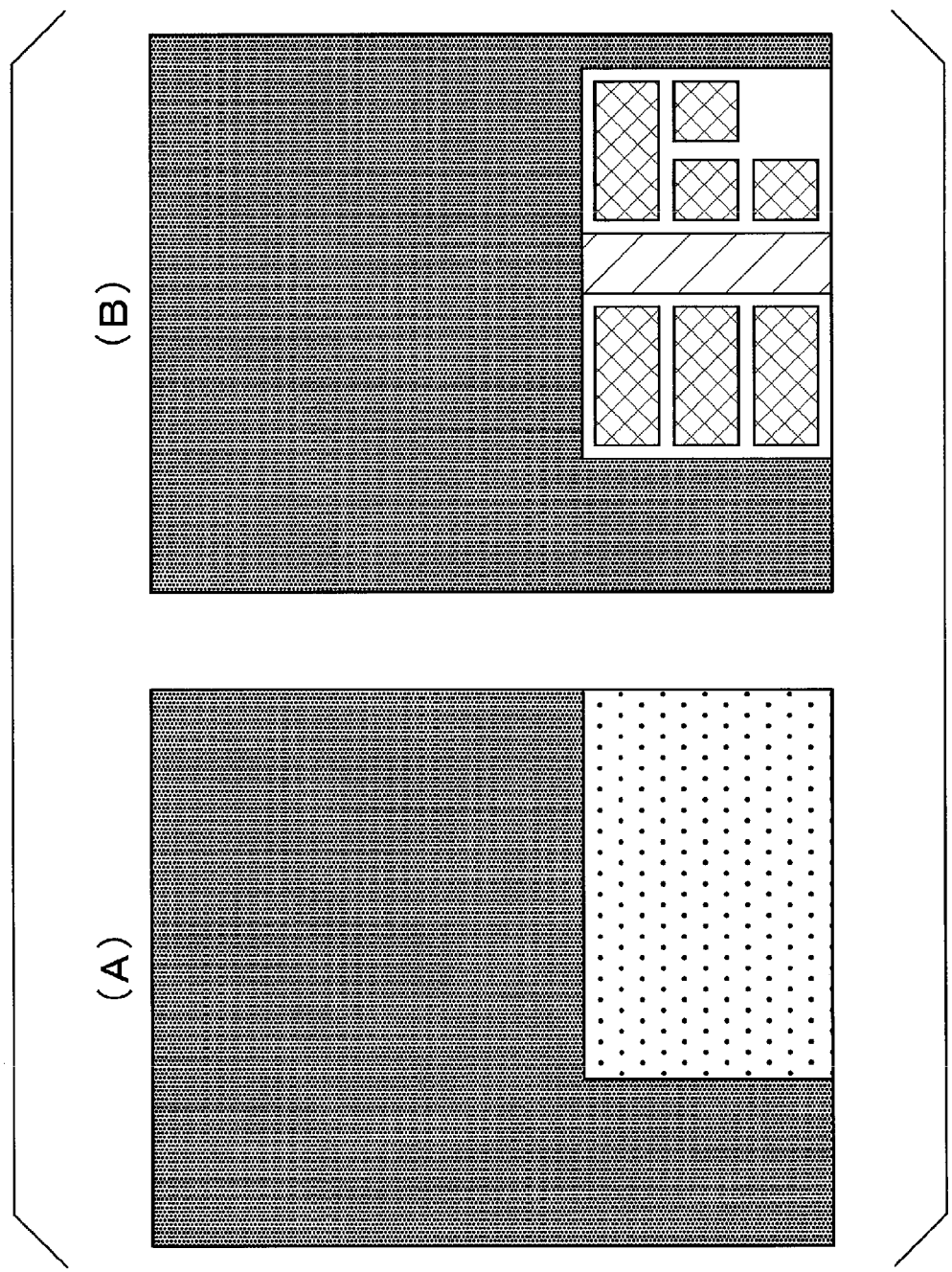

LEARNING DATA GENERATION APPARATUS, CHANGE AREA DETECTION METHOD AND COMPUTER PROGRAM

CROSS-REFERENCE TO RELATED APPLICATIONS

This application is a 371 U.S. National Phase of International Application No. PCT/JP2019/015108, filed on Apr. 5, 2019, which claims priority to Japanese Application No. 2018-077109 filed on Apr. 12, 2018. The entire disclosures of the above applications are incorporated herein by reference.

TECHNICAL FIELD

The present invention relates to a technique that supports generation of data for learning used for machine learning.

BACKGROUND ART

In recent years, a technique has been attracting attention which uses images in which substantially the same space (hereinafter referred to as "target space") is captured at different dates and times and thereby detects a time change in a structure or the like present in the target space. For example, attempts have been made to detect newly constructed objects such as buildings and roads by using such a technique.

Further, such a technique may be used for work for updating of a map. In this case, for identification of an updated part, an image such as a satellite image is used in which the target space is captured in an overhead view similar to a map. To identify updated parts, constructions that are newly constructed in the target space have to be recognized, but in order to make this, work for finding new constructions from a large amount of satellite images. However, huge time cost and human cost are taken for performing this work by manpower. Thus, a method has been proposed in which image processing is applied to image data of time series satellite images and new constructions in a target space are thereby detected as time series changes between satellite images (see Non-Patent Literature 1, for example).

CITATION LIST

Non-Patent Literature

Non-Patent Literature 1: J. Tang, C. Deng, G. B. Huang and B. Zhao, "Compressed-Domain Ship Detection on Spaceborne Optical Image Using Deep Neural Network and Extreme Learning Machine," in IEEE Transactions on Geoscience and Remote Sensing, vol. 53, no. 3, pp. 1174-1185, March 2015.

SUMMARY OF THE INVENTION

Technical Problem

One of algorithms for detecting a time series change between images is a detection method based on machine learning. The detection method based on machine learning is categorized into a detection method based on supervised learning and a detection method based on unsupervised learning. In the detection method based on supervised learning, a large amount of images in which one or both of a region in which a change occurs in a target space (hereinafter referred to as "changed region") and a region in which no change occurs (hereinafter referred to as "unchanged region") are captured are collected, and image data are learned such that the probability that an image of the changed region is detected as having a change is maximized.

In general, data used for learning of image data for the purpose of identification of the changed region (hereinafter referred to as "learning data") include images prior and subsequent to a change or a parameter acquired from those images and labels that are associated with those images or the parameter and indicate presence or absence of a change. For example, the parameter obtained from images is a feature amount or a feature vector for identifying presence or absence of a change. In general, the feature amount of an image is acquired by computation based on pixel values, and the feature vector is acquired as information such as a code quantity or a motion vector by computation based on data in which images corresponding to the changed region are coded.

In related art, in a case where images in which the changed region is captured are acquired for creation of learning data, work for identifying presence or absence of a change by comparison between image data captured at different dates and times and for extracting image data of the changed region is performed by manpower. Further, in order to detect a change in a construction in addition to presence or absence of the changed region, labeling of a change to be detected has to be performed for the image data of the changed region, a region in which the change to be detected is captured has to be detected from the image in order to perform the labeling, and such labeling work is performed by manpower in related art. Thus, in related art, huge time cost and human cost are taken for creation of such learning data.

In consideration of the above circumstance, an object of the present invention is to provide a technique that may reduce a load of creation of learning data used by a device which detects a change in an image.

Means for Solving the Problem

One aspect of the present invention provides a learning data generation device including: a detection unit that detects a changed region in a space between a first map and a second map based on first map data which indicate the first map and second map data which indicate the second map which indicates a substantially same space as the first map and represents the space at a different time point from the first map; and a changed region image acquisition unit that acquires images which correspond to the changed region detected by the detection unit from a first image in which the space represented by the first map is captured and a second image in which the space represented by the second map is captured.

One aspect of the present invention provides the learning data generation device, in which the detection unit acquires data that indicate a visual feature of the changed region from the first map data and the second map data.

One aspect of the present invention provides the learning data generation device, in which the first difference image and the second difference image are images in which the changed region is represented by a first value and a region other than the changed region is represented by a second value.

One aspect of the present invention provides the learning data generation device, in which the changed region image acquisition unit generates data in which image data which indicate the changed region are associated with information which indicates presence or absence of a change in the changed region.

One aspect of the present invention provides the learning data generation device further including: a difference position information acquisition unit that acquires first difference position information which indicates a position of the changed region in the first image based on first position information which indicates a captured range of the first image and acquires second difference position information which indicates a position of the changed region in the second image based on second position information which indicates a captured range of the second image; and a difference image generation unit that generates a first difference image which represents the space by the changed region and a region other than the changed region based on the first difference position information acquired by the difference position information acquisition unit and generates a second difference image which represents the space by the changed region and a region other than the changed region based on the second difference position information acquired by the difference position information acquisition unit, in which the changed region image acquisition unit extracts a first changed region image that corresponds to the changed region from the first image based on the first difference image generated by the difference image generation unit and extracts a second changed region image that corresponds to the changed region from the second image based on the second difference image generated by the difference image generation unit.

One aspect of the present invention provides a changed region detection method including: a detection step of detecting a changed region in a space between a first map and a second map based on first map data that indicate the first map and second map data that indicate the second map which indicates a substantially same space as the first map and represents the space at a different time point from the first map; and a changed region image acquisition step of acquiring images that correspond to the changed region detected in the detection step from a first image in which the space represented by the first map is captured and a second image in which the space represented by the second map is captured.

One aspect of the present invention provides a computer program causing a computer to execute: a detection step of detecting a changed region in a space between a first map and a second map based on first map data that indicate the first map and second map data that indicate the second map which indicates a substantially same space as the first map and represents the space at a different time point from the first map; and a changed region image acquisition step of acquiring images that correspond to the changed region detected in the detection step from a first image in which the space represented by the first map is captured and a second image in which the space represented by the second map is captured.

Effects of the Invention

The present invention enables reduction in a load of creation of learning data used by a device that detects a change in an image.

BRIEF DESCRIPTION OF DRAWINGS

FIG. 10 is a diagram that illustrates specific examples of a first changed region image and a second changed region image in the embodiment.

DESCRIPTION OF EMBODIMENTS

Figure 1:
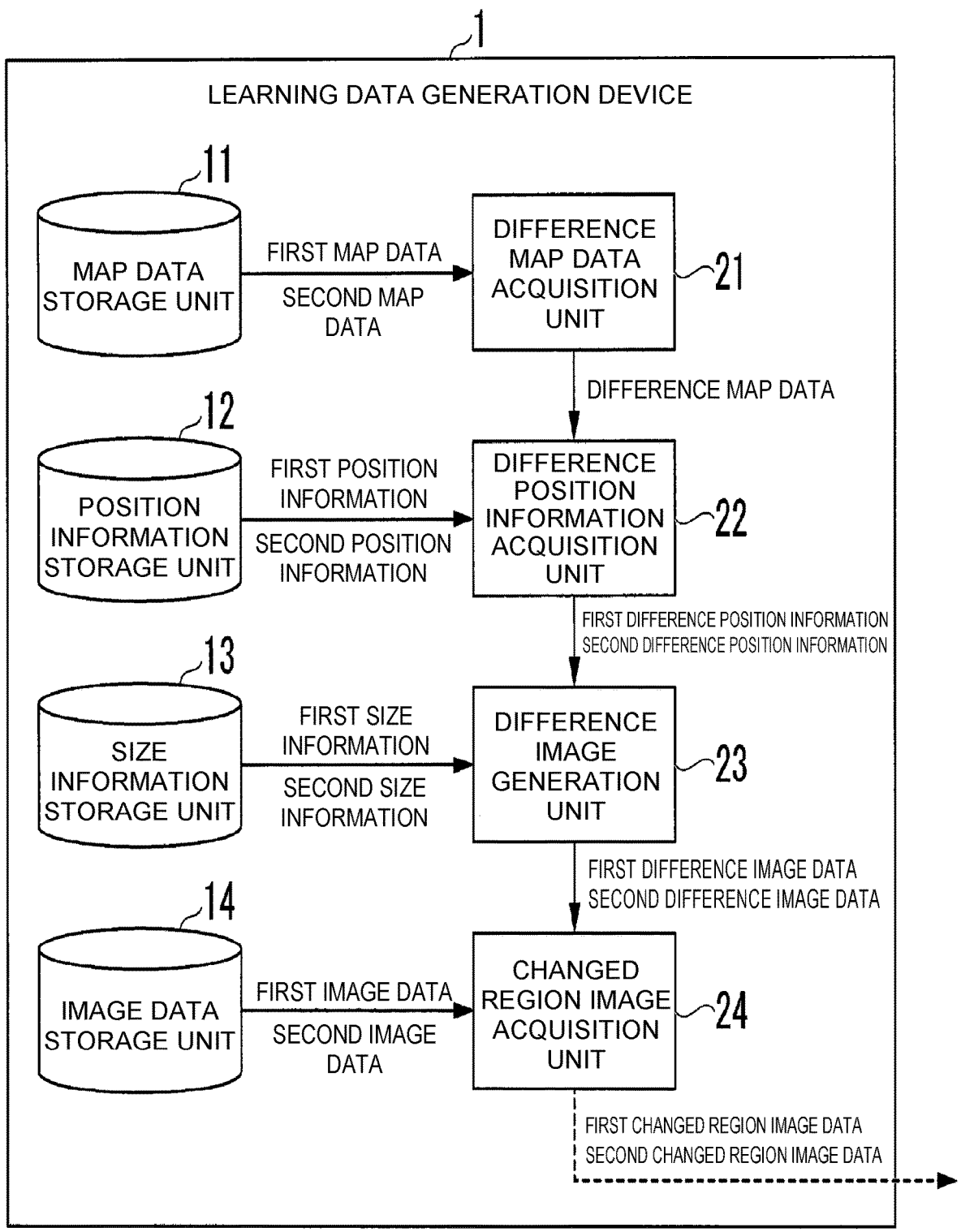
FIG. 1 is a diagram that illustrates a specific example of a function configuration of a learning data generation device 1 of an embodiment.

FIG. 1 is a diagram that illustrates a specific example of a function configuration of a learning data generation device 1 of an embodiment. The learning data generation device 1 includes a central processing unit (CPU), a memory, an auxiliary storage device, and so forth, which are connected together by a bus, and executes a program. The learning data generation device 1 executes the program and thereby functions as a device that includes a map data storage unit 11, a position information storage unit 12, a size information storage unit 13, an image data storage unit 14, a difference map data acquisition unit 21, a difference position information acquisition unit 22, a difference image generation unit 23, and a changed region image acquisition unit 24. Note that a portion or all of functions of the learning data generation device 1 may be realized by using hardware such as an application specific integrated circuit (ASIC), a programmable logic device (PLD), or a field programmable gate array (FPGA). The program may be recorded in a computer-readable recording medium. A computer-readable recording medium is a portable medium such as a flexible disk, a magneto-optical disk, a ROM, or a CD-ROM or a storage device such as a hard disk built in a computer system, for example. A program may be transmitted by an electric communication line.

The map data storage unit 11, the position information storage unit 12, the size information storage unit 13, and the image data storage unit 14 are configured by using storage devices such a magnetic hard disk device and a semiconductor storage device. The map data storage unit 11 stores first map data and second map data. The map data are information that indicates a map of a space as a target of detection of a changed region (hereinafter referred to as "target space"). The target space indicated by the first map data is substantially the same space as the target space indicated by the second map data. Further, the first map data and the second map data respectively indicate the target space at different time points. In the following description, it is assumed that the first map data indicate the target space in a past in time series compared to the target space indicated by the second map data. Further, it is assumed that the map data storage unit 11 in advance stores the first map data and the second map data.

For example, the map data may be made such that the shapes of target objects reflected on the map such as structures and natural objects are reflected, by planes or polygon data, in a region on the map which is associated with a region in which the structures and natural objects are present. A specific example may be data in a hierarchical structure (for example, polygon data) that represent constructions such as houses and wall-less buildings on a map. Note that in a case where the position of the construction is clear, the map data may be information in which image data in which the target space is captured are associated with the position information of the construction.

The position information storage unit 12 stores first position information and second position information. The position information mentioned here is information that indicates the range of a space captured in an image. The first position information indicates the range of a space captured in an image indicated by first image data, which will be described later. The second position information indicates the range of a space captured in an image indicated by second image data, which will be described later. For example, the first position information and the second position information are represented by combinations of latitude and longitude. It is assumed that the position information storage unit 12 in advance stores the first position information and the second position information.

The size information storage unit 13 stores first size information and second size information. The size information is information that indicates the size of an image. The first size information and the second size information respectively indicate the sizes of images that are represented by the first image data and the second image data, which will be described later. It is assumed that the size information storage unit 13 in advance stores the first size information and the second size information.

The image data storage unit 14 stores the first image data and the second image data. The first image data and the second image data are image data in which the target space is captured. The target space indicated by the first image data is substantially the same space as the target space indicated by the second image data. Further, the first image data and the second image data respectively indicate the target space captured at different time points. Further, the first image data indicate the target space at substantially the same time point as the first map data, and the second image data indicate the target space at substantially the same time point as the second map data.

That is, the first image data indicate the target space in a past in time series compared to the target space indicated by the second image data. It is assumed that the image data storage unit 14 in advance stores the first image data and the second image data. Note that in this embodiment, satellite images in which the target space is captured are acquired as the first image data and the second image data. Further, in the following, an image indicated by the first image data will be referred to as first image, and an image indicated by the second image data will be referred to as second image.

The difference map data acquisition unit 21 (one example of a detection unit in the present invention) acquires the first map data and the second map data from the map data storage unit 11. The difference map data acquisition unit 21 acquires data that indicate a visual change between the target space indicated by the first map data and the target space indicated by the second map data. Here, the visual change in the target space means a change in the target space which may be seen from the maps. For example, changes in the target space which may be seen from the maps include a change such as presence or absence of a construction in the target space, a change in the shape of a construction, and so forth.

For example, in a case where the map data represent such a visual change by polygon data or image data, data that indicate the visual change may be acquired as difference data between sets of map data. When such difference data (hereinafter referred to as "difference map data") are acquired, map data of a region that includes a construction or the like which is present in one map but is not present in the other map may be extracted. In general, the map data include data that indicate visual features of a target region and data that indicate characters, signs, numerical values, and so forth which indicate attributes of visual features. The difference map data acquisition unit 21 acquires differences in data that indicate the visual features among various kinds of data included in the map data as the difference map data.

Here, the visual feature is information that represents a difference between images in the target region in the map data. More specifically, the visual feature is information that indicates a region in which a change to be detected appears and may include information that represents a difference between images of the region. For example, the visual features are changes in the length of an edge, the number of edges, the angle of a corner at which edges cross, the distance between corners, a region surrounded by an edge and a corner, and so forth.

That is, the difference map data are map data of a region in which a change in the visual feature has occurred in accordance with a lapse of time in the target space (hereinafter referred to as "changed region"). In the following, a region in which a time change has not occurred in the target space will be referred to as unchanged region, distinguishing that from the changed region. The difference map data acquisition unit 21 outputs the acquired difference map data to the difference position information acquisition unit 22.

The difference position information acquisition unit 22 acquires the first position information and the second position information from the position information storage unit 12 and acquires the difference map data from the difference map data acquisition unit 21. The difference position information acquisition unit 22 acquires difference position information based on the first position information, the second position information, and the difference map data. The difference position information is information that indicates the position of the changed region in an image. For example, the difference position information is represented by pixel coordinates that use each of pixels which indicate an image as a unit.

Specifically, the difference position information acquisition unit 22 acquires first difference position information that indicates the position of the changed region in the first image based on the first position information and the difference map data and acquires second difference position information that indicates the position of the changed region in the second image based on the second position information and the difference map data. The difference position information acquisition unit 22 outputs the acquired first difference position information and second difference position information to the difference image generation unit 23.

The difference image generation unit 23 acquires the first size information and the second size information from the size information storage unit 13 and acquires the first difference position information and the second difference position information from the difference position information acquisition unit 22. The difference image generation unit 23 generates a difference image based on the first size information, the second size information, the first difference position information, and the second difference position information. The difference image is an image that represents the target space by either one of the changed region and the unchanged region. For example, the difference image is a binary image that represents the changed region by a value of "1" and the unchanged region by a value of "0". The changed region may be represented by plural values in a case where the changed region is identified by categorizing that into plural kinds.

Specifically, the difference image generation unit 23 generates a first difference image that corresponds to the first image based on the first difference position information and the first size information and generates a second difference image that corresponds to the second image based on the second difference position information and the second size information. The difference image generation unit 23 outputs first difference image data that indicate the first difference image and second difference image data that indicate the second difference image to the changed region image acquisition unit 24.

The changed region image acquisition unit 24 acquires the first image data and the second image data from the image data storage unit 14 and acquires the first difference image data and the second difference image data from the difference image generation unit 23. The changed region image acquisition unit 24 detects the changed region captured in the first image and the second image based on the first image data, the second image data, the first difference image data, and the second difference image data.

Specifically, the changed region image acquisition unit 24 extracts image data of a portion in which the changed region is captured from the first image based on the first image data and the first difference image data. Here, the first difference image data are image data that indicate the first difference image which has the same image size as the first image. For example, in a case where the first difference image is a binary image that represents the changed region by a value of "1" and the unchanged region by a value of "0", the changed region image acquisition unit 24 multiplies each pixel value of the first image by the pixel value at the same coordinates in the first difference image. As a result, the unchanged region is masked in the first image. The changed region image acquisition unit 24 extracts an image of a portion which is not masked (that is, an image of the changed region) from the first image.

The changed region image acquisition unit 24 performs similar processing to the above and thereby extracts a portion in which the changed region is captured from the second image based on the second image data and the second difference image data. The changed region image acquisition unit 24 outputs the image data that indicate the image of the changed region which is extracted from the first image (hereinafter referred to as "first changed region image data") and the image data that indicate the image of the changed region which is extracted from the second image (hereinafter referred to as "second changed region image data") as learning data.

Figure 2:
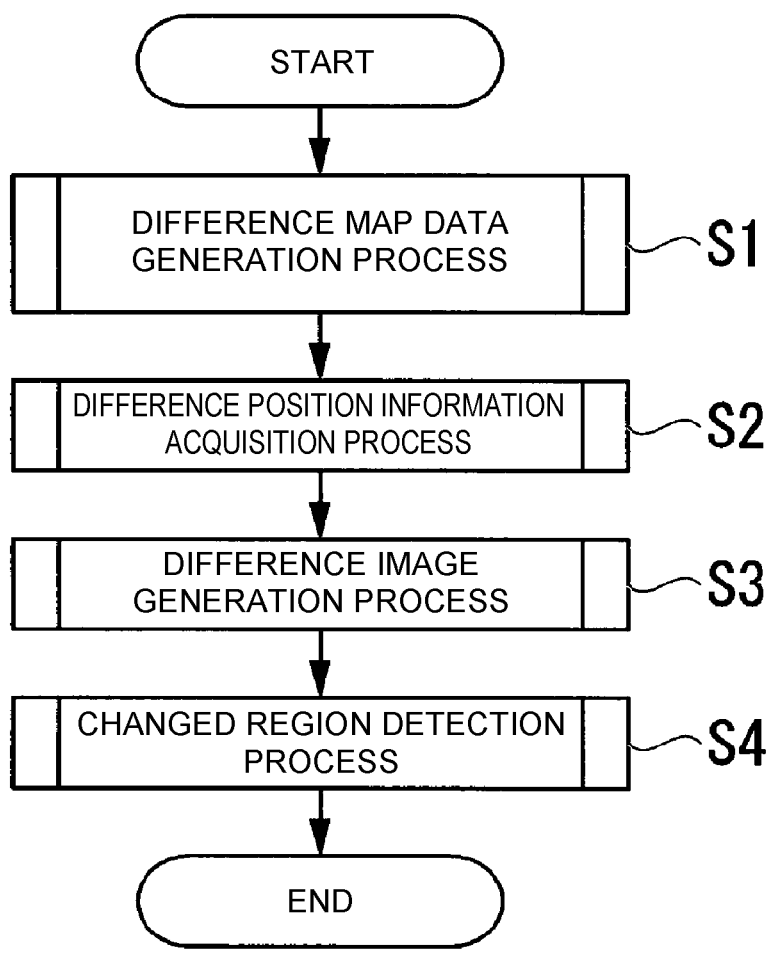
FIG. 2 is a flowchart that illustrates a specific example of processing in which the learning data generation device 1 of the embodiment generates the learning data.

FIG. 2 is a flowchart that illustrates a specific example of processing in which the learning data generation device 1 of the embodiment generates the learning data. First, in the learning data generation device 1, the difference map data acquisition unit 21 executes a difference map data generation process (step S1). The difference map data acquisition unit 21 executes the difference map data generation process, and the difference map data that indicate the difference between the first map data and the second map data are thereby acquired.

Next, the difference position information acquisition unit 22 executes a difference position information acquisition process (step S2). The difference position information acquisition unit 22 executes the difference position information acquisition process, and the first difference position information that indicates the position of the changed region in the first image and the second difference position information that indicates the position of the changed region in the second image are thereby acquired.

Next, the difference image generation unit 23 executes a difference image generation process (step S3). The difference image generation unit 23 executes the difference image generation process, and the first difference image data that are an image with the same size as the first image and represent the target space by the changed region and the unchanged region and the second difference image data that are an image with the same size as the second image and represent the target space by the changed region and the unchanged region are thereby acquired.

Next, the changed region image acquisition unit 24 executes a changed region detection process (step S4). The changed region image acquisition unit 24 executes the changed region detection process, and the first changed region image data that indicate the image of the changed region which is extracted from the first image and the second changed region image data that indicate the image of the changed region which is extracted from the second image are thereby acquired.

The learning data generation device 1 outputs the acquired first changed region image data and second changed region image data as the learning data.

Figure 3:
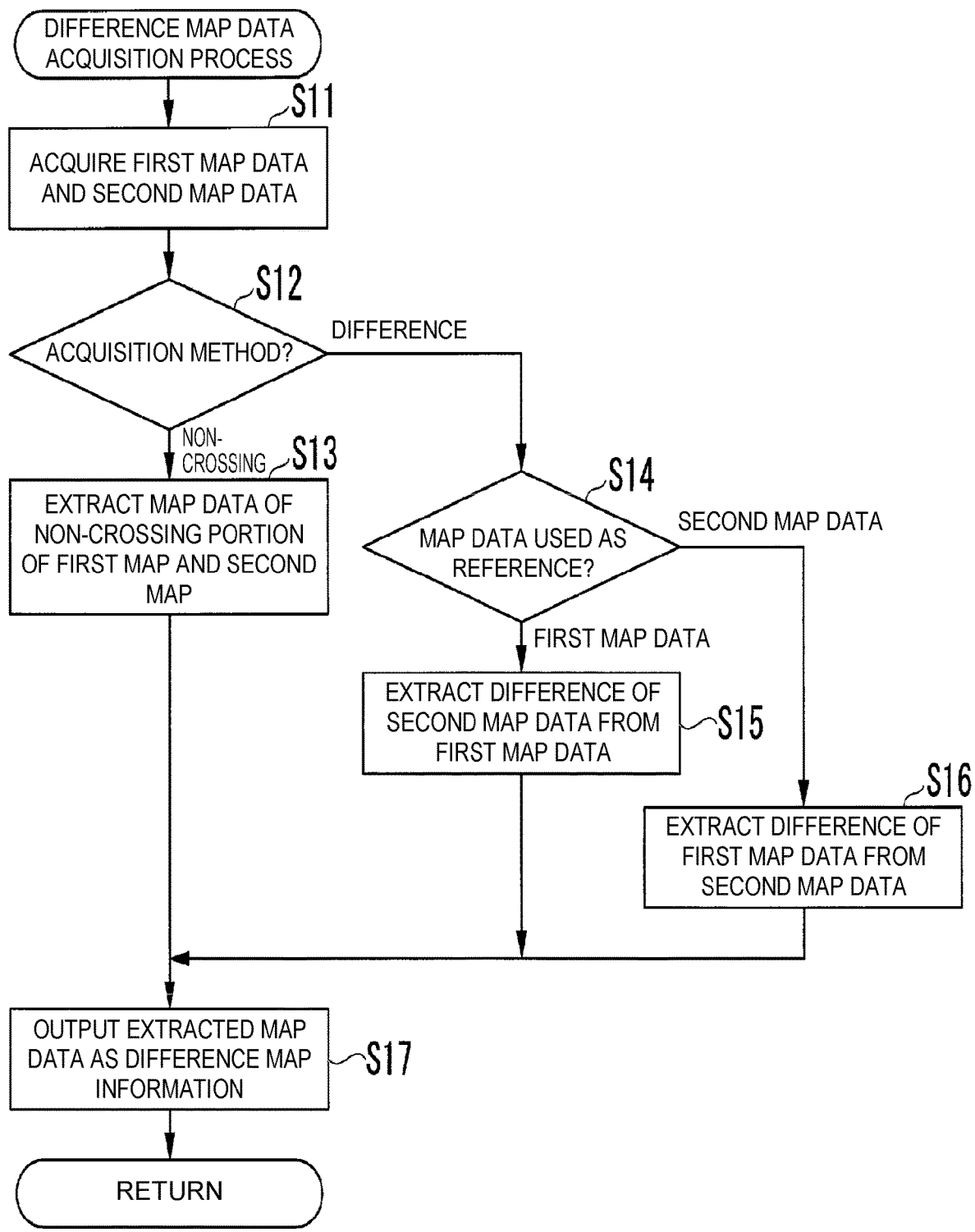
FIG. 3 is a flowchart that illustrates a specific example of a difference map data generation process in the embodiment.

FIG. 3 is a flowchart that illustrates a specific example of the difference map data generation process in the embodiment. First, the difference map data acquisition unit 21 acquires the first map data and the second map data from the map data storage unit 11 (step S11). The difference map data acquisition unit 21 determines an acquisition method of the difference map data (step S12). Here, as the acquisition method of the difference map data, the two following methods are suggested.

A first method is a method of extracting a non-crossing portion between a first map and a second map (non-crossing extraction). This method is a method of extracting a non-crossing portion in which line segments in the maps do not cross when the first map and the second map are superimposed and is a method of extracting a construction or the like that is present only in either one of the maps. Meanwhile, a second method is a method of acquiring a numerical difference between the first map data and the second map data. This method is a method of obtaining the difference between data values that correspond to the same position on the maps, in which no difference is obtained in the unchanged region but the difference is obtained only in the changed region.

Note that which of the two methods is used for acquisition of the difference map data may be selected in accordance with the kind, properties, or the like of the map data used for generation of the learning data. Here, it is assumed that information that indicates the acquisition method of the difference map data is in advance stored in the learning data generation device 1 and the acquisition method is determined based on this information. Note that the acquisition method of the difference map data may be designated by a user in execution of step S12.

In a case where the first method is determined to be the acquisition method of the difference map data (step S12: non-crossing), the difference map data acquisition unit 21 identifies the non-crossing portion between the first map and the second map and extracts the map data that indicate the non-crossing portion from the first map data and the second map data (step S13).

On the other hand, in a case where the second method is determined to be the acquisition method of the difference map data (step S12: difference), the difference map data acquisition unit 21 determines which of the first map and the second map is used as a reference when the difference is obtained (step S14). Here, it is assumed that information that indicates the map data to be used as the reference is in advance stored in the learning data generation device 1 and the map data used as the reference are determined based on this information. Note that the map data used as the reference may be designated by the user in execution of step S14.

In a case where the first map data are determined to be the map data used as the reference (step S14: first map data), the difference map data acquisition unit 21 extracts the difference of the second map data from the first map data (step S15). Specifically, the difference map data acquisition unit 21 extracts the map data of a region in which the difference obtained by subtraction of the data value of the first map data from the data value of the second map data is a prescribed value or greater.

In a case where the second map data are determined to be the map data used as the reference (step S14: second map data), the difference map data acquisition unit 21 extracts the difference of the first map data from the second map data (step S16). Specifically, the difference map data acquisition unit 21 extracts the map data of a region in which the difference obtained by subtraction of the data value of the second map data from the data value of the first map data is a prescribed value or greater.

The difference map data acquisition unit 21 outputs the map data extracted in step S13, S15, or S16 as the difference map data to the difference position information acquisition unit 22 (step S17).

Figure 4:
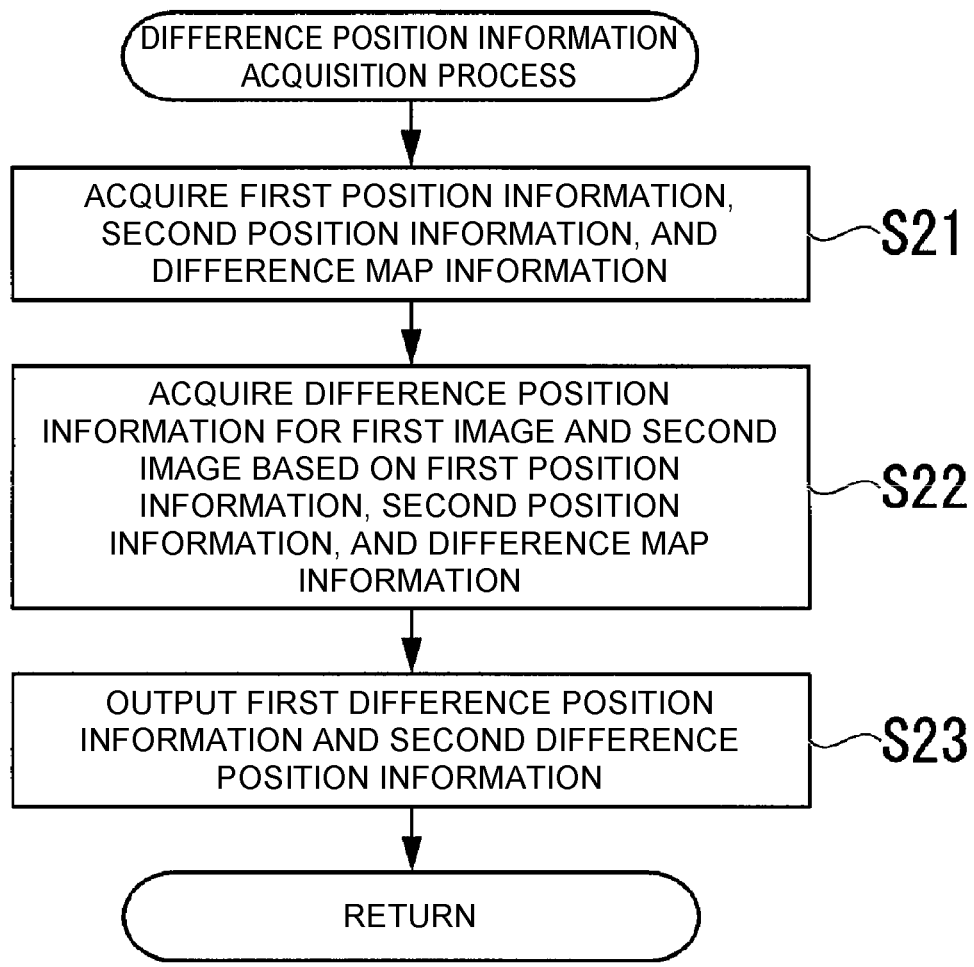
FIG. 4 is a flowchart that illustrates a specific example of a difference position information acquisition process in the embodiment.

FIG. 4 is a flowchart that illustrates a specific example of the difference position information acquisition process in the embodiment. First, the difference position information acquisition unit 22 acquires the first position information and the second position information from the position information storage unit 12 and acquires the difference map data from the difference map data acquisition unit 21 (step S21). The difference position information acquisition unit 22 acquires the difference position information for each of the first image and the second image based on the first position information, the second position information, and difference map information (step S22).

Specifically, the difference map data acquisition unit 21 collates the position information of the target space which is indicated by the first position information (that is, the position information of the target space captured in the first image) with the position information of the changed region indicated by the difference map information and acquires the first difference position information that indicates the position of the changed region in the first image. Similarly, the difference map data acquisition unit 21 collates the position information of the target space which is indicated by the second position information (that is, the position information of the target space captured in the second image) with the position information of the changed region indicated by the difference map information and acquires the second difference position information that indicates the position of the changed region in the second image.

The difference map data acquisition unit 21 outputs the acquired first difference position information and second difference position information to the difference image generation unit 23 (step S23).

Figure 5:
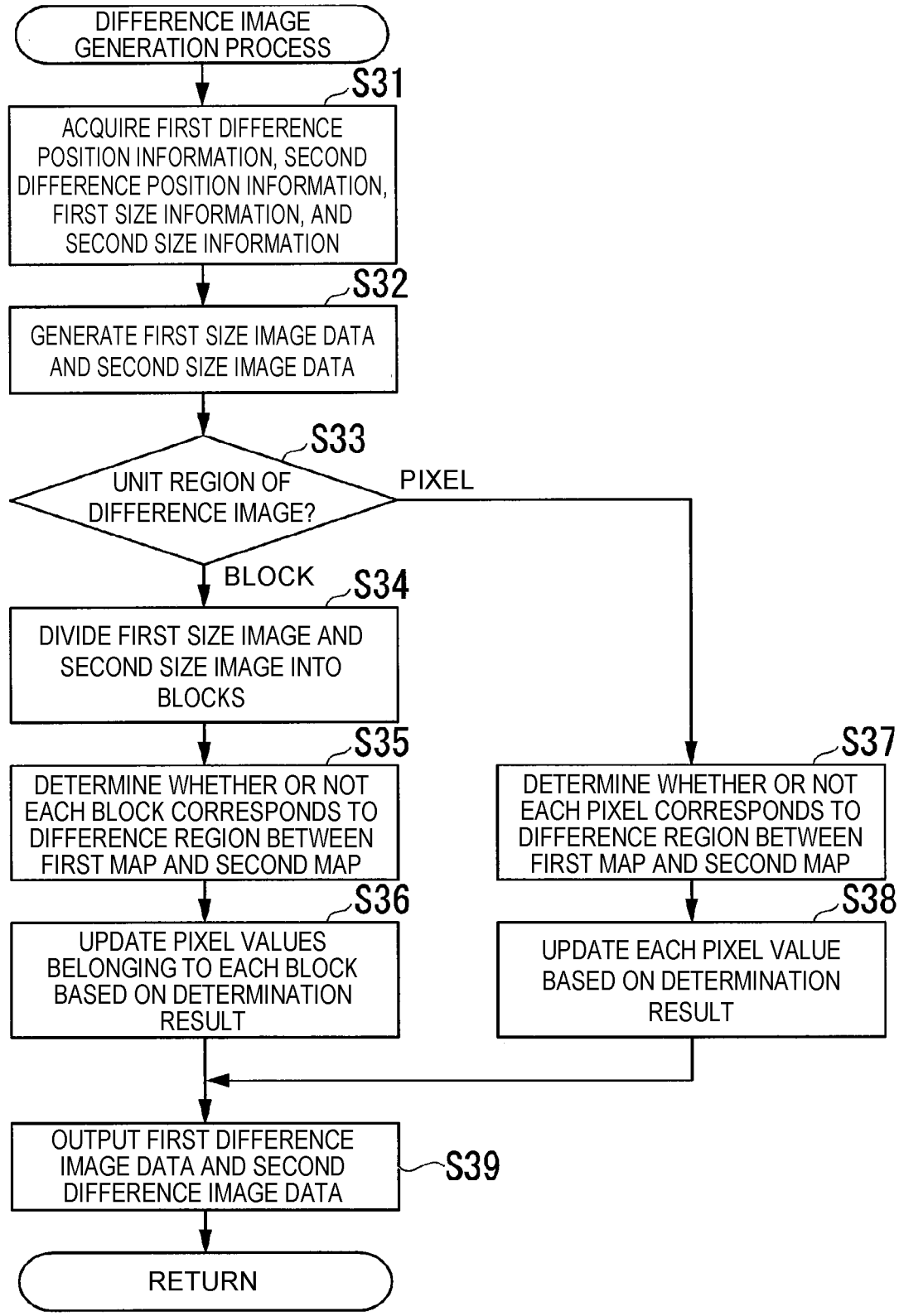
FIG. 5 is a flowchart that illustrates a specific example of a difference image generation process in the embodiment.

FIG. 5 is a flowchart that illustrates a specific example of the difference image generation process in the embodiment. First, the difference image generation unit 23 acquires the first size information and the second size information from the size information storage unit 13 and acquires the first difference position information and the second difference position information from the difference position information acquisition unit 22 (step S31). The difference image generation unit 23 generates a first size image with the same size as the first image based on the first size information and generates a second size image with the same size as the second image based on the second size information (step S32).

Here, the first size image is image data that serve as a reference of the first difference image generated by the difference image generation unit 23 in the difference image generation process. The first size image may be any image as long as that is an image with the same size as the first image. For example, the first size image may be an image in which all pixels represent the same color or may be an image in which all pixel values are a null value. Similarly, the second size image is image data that serve as a reference of the second difference image and may be any image as long as that is an image with the same size as the second image.

The difference image generation unit 23 determines which of a block or a pixel is used as a unit region of the difference image (step S33). Here, it is assumed that information that indicates the unit region in generation of the difference image is in advance stored in the learning data generation device 1 and the unit region of the difference image is determined based on this information. Note that the unit region of the difference image may be designated by the user in execution of step S32.

In a case where the block is determined to be the unit region of the difference image (step S33: block), the difference image generation unit 23 divides the first size image and the second size image into blocks with prescribed dimensions (step S34). The difference image generation unit 23 determines whether or not each block of the first size image and the second size image corresponds to a difference region between the first map and the second map (that is, the changed region) (step S35).

Specifically, the difference image generation unit 23 determines whether or not the position of each of the blocks of the first size image corresponds to the position of the changed region in the first image based on the first difference position information. Similarly, the difference image generation unit 23 determines whether or not the position of each of the blocks of the second size image corresponds to the position of the changed region in the second image based on the second difference position information.

The difference image generation unit 23 updates each of the pixel values of the first size image and the second size image based on the determination result in step S35 (step S36). For example, the difference image generation unit 23 updates each of the pixel values, which belong to the block which corresponds to the changed region, to "1" and updates each of the pixel values, which belong to the block which does not correspond to the changed region (that is, which corresponds to the unchanged region), to "0". Accordingly, the first size image and the second size image become images configured with pixels with the value that corresponds to the changed region and pixels with the value that corresponds to the unchanged region.

Meanwhile, in a case where the pixel is determined to be the unit region of the difference image (step S33: pixel), the difference image generation unit 23 determines whether or not each of the pixels of the first size image and the second size image corresponds to the difference region between the first map and the second map (that is, the changed region) (step S37). The difference image generation unit 23 updates each of the pixel values of the first size image and the second size image based on the determination result in step S37 (step S38).

The difference image generation unit 23 outputs the image data that indicate the first size image updated in step S36 or S38 as the first difference image data and outputs the image data that indicate the updated second size image as the second difference image data (step S39).

Figure 6:
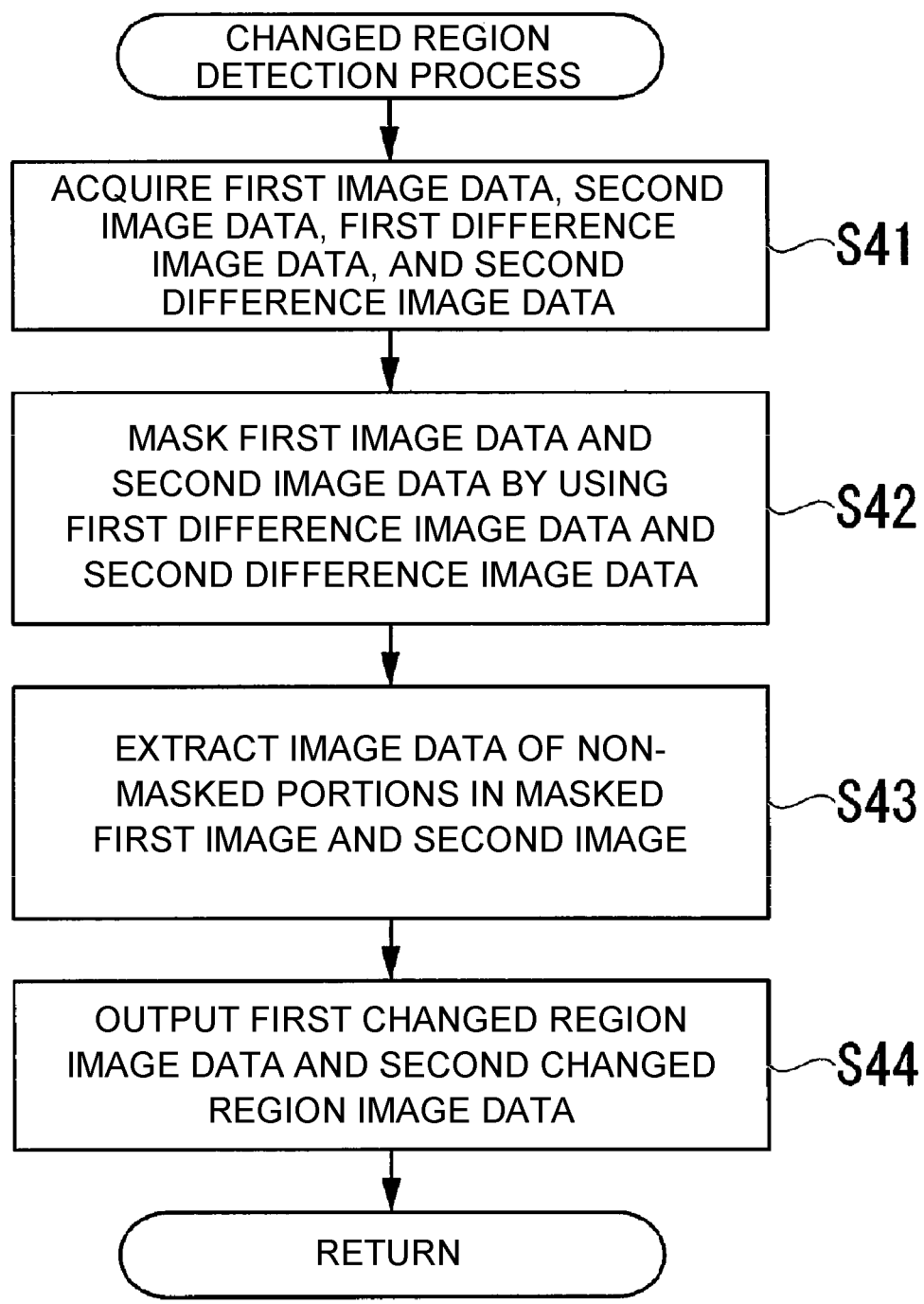
FIG. 6 is a flowchart that illustrates a specific example of a changed region detection process in the embodiment.

FIG. 6 is a flowchart that illustrates a specific example of the changed region detection process in the embodiment. First, the changed region image acquisition unit 24 acquires the first image data and the second image data from the image data storage unit 14 and acquires the first difference image data and the second difference image data from the difference image generation unit 23 (step S41).

The changed region image acquisition unit 24 masks the first image data and the second image data by using the first difference image data and the second difference image data (step S42). Specifically, the changed region image acquisition unit 24 masks the first image data by using the first difference image data and masks the second image data by using the second difference image data. For example, in a case where "1" represents the changed region and "0" represents the unchanged region in the first difference image, the masked first image becomes an image in which only the image of the unchanged region is masked in the first image as the base.

The changed region image acquisition unit 24 extracts the image data of the portions which are not masked in the masked first image and second image (step S43). By this process, the image data that indicate the image of the changed region are extracted from the first image data and the second image data. The changed region image acquisition unit 24 outputs the image data extracted from the first image data as the first changed region image data and outputs the image data extracted from the second image data as the second changed region image data (step S44).

Figure 7:
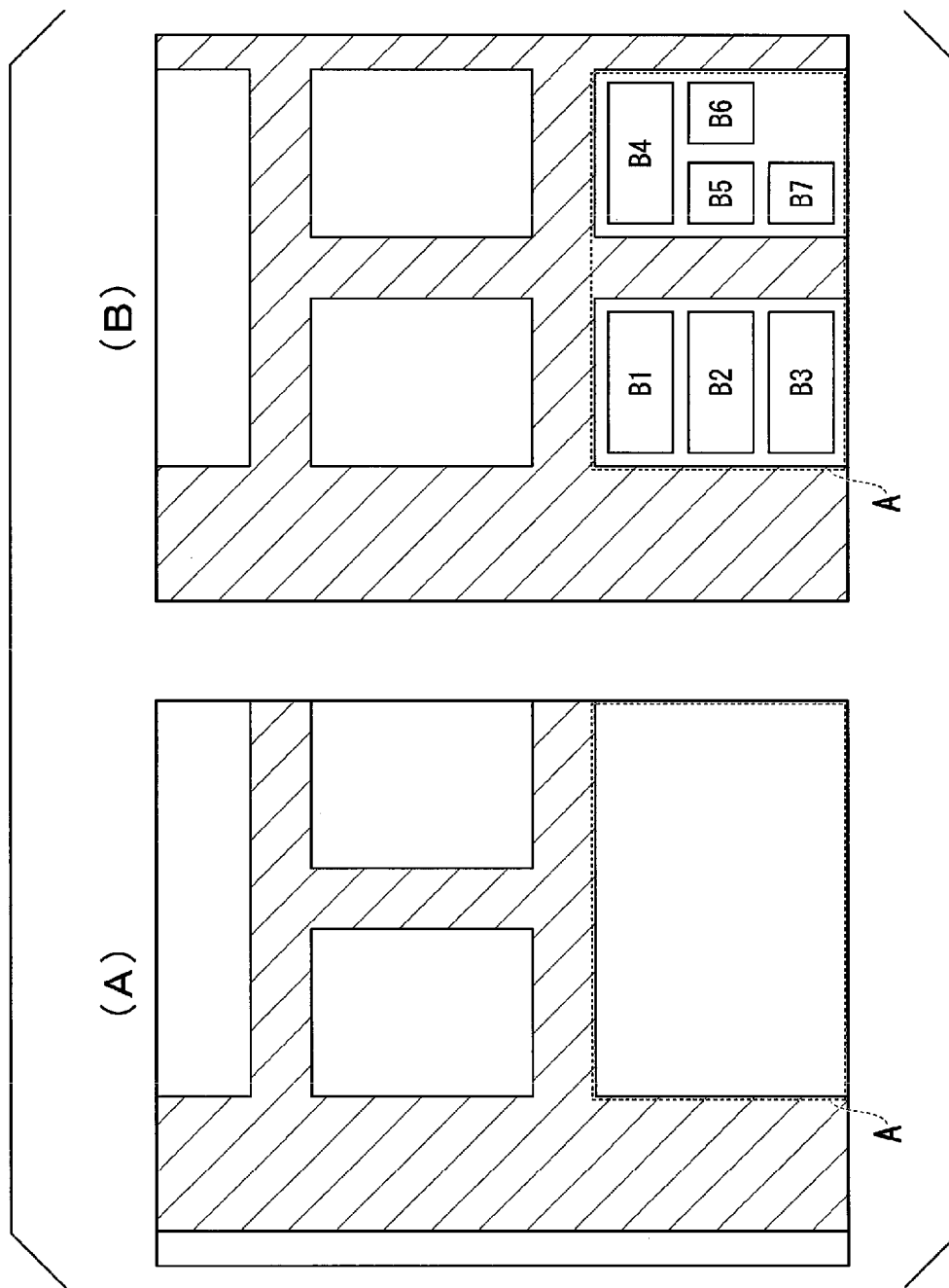
FIG. 7 is a diagram that illustrates specific examples of a first map and a second map in the embodiment.

FIG. 7 is a diagram that illustrates specific examples of the first map and the second map in the embodiment. FIG. 7(A) illustrates the specific example of the first map, and FIG. 7(B) illustrates the specific example of the second map. The shaded portions in FIG. 7(A) and FIG. 7(B) represent roads. As described above, the first map and the second map indicate substantially the same target space (the spaces in bold line frames in the drawing), the first map indicates the target region in a past compared to the target region indicated by the second map. FIG. 7 represents that a space A (the space of a portion surrounded by broken lines) in the target space is changed from a state where nothing is present to a state where constructions B1 to B7 are constructed. In a case of this example, the map data of the portion of the space A are acquired as the difference map data in the difference map data generation process. Further, in the case of this example, in the difference position information acquisition process, the position information of the space A in each image of the first image and the second image is acquired as the difference position information.

Figure 8:
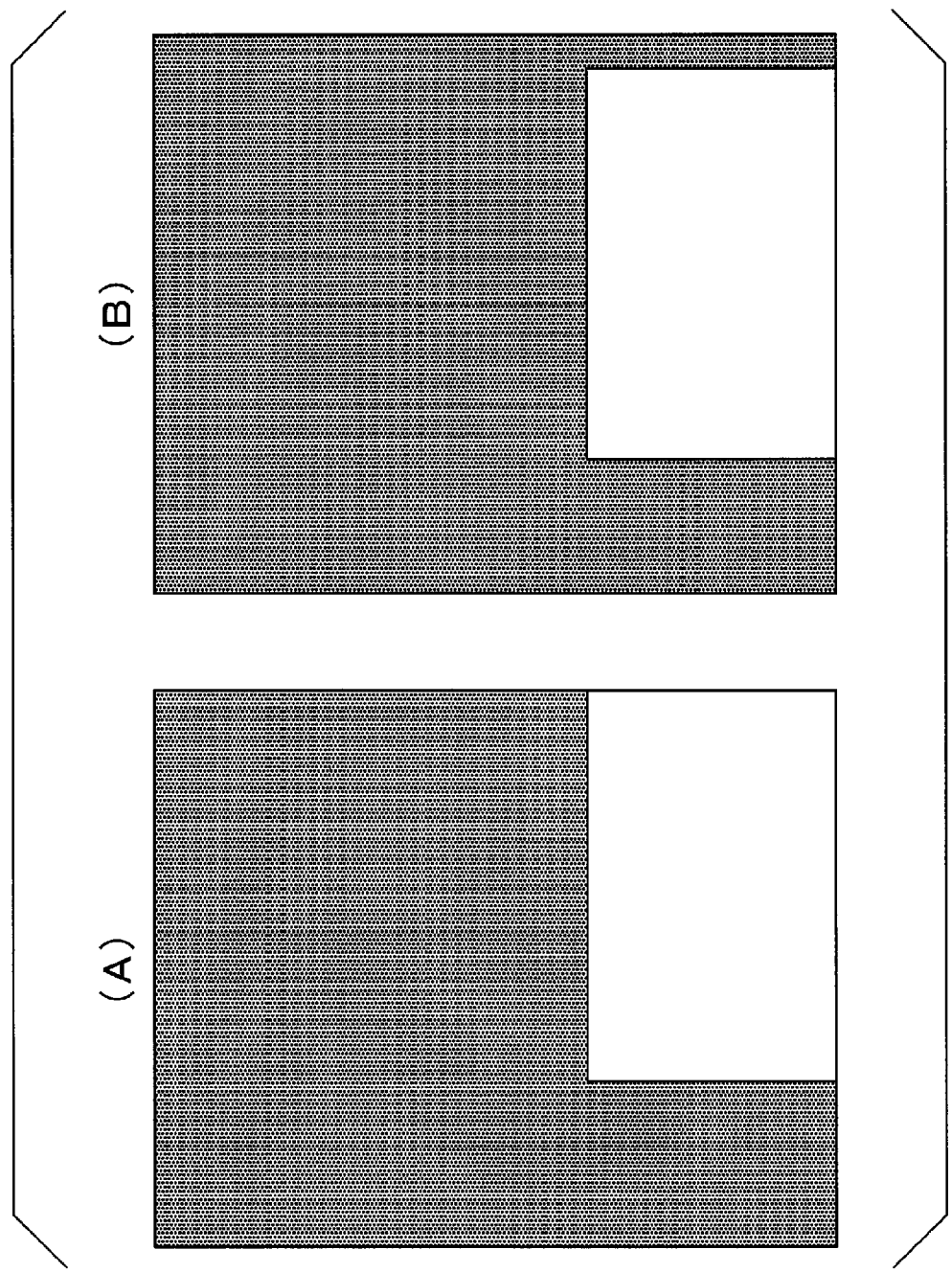
FIG. 8 is a diagram that illustrates specific examples of a first difference image and a second difference image in the embodiment.

FIG. 8 is a diagram that illustrates specific examples of the first difference image and the second difference image in the embodiment. FIG. 8(A) illustrates the specific example of the first difference image that corresponds to the first map in FIG. 7(A), and FIG. 8(B) illustrates the specific example of the second difference image that corresponds to the second map in FIG. 7(B). As described above, the first difference image has the same size as the first image, and the second difference image has the same size as the second image. In a case of this example, in the difference image generation process, images that represent the target space by the region of the space A (that is, the changed region) and the region other than that (that is, the unchanged region) are generated as the first difference image and the second difference image. FIG. 8 illustrates examples of the difference images that represent the changed region by "1" and represent the unchanged region by "0".

Figure 9:
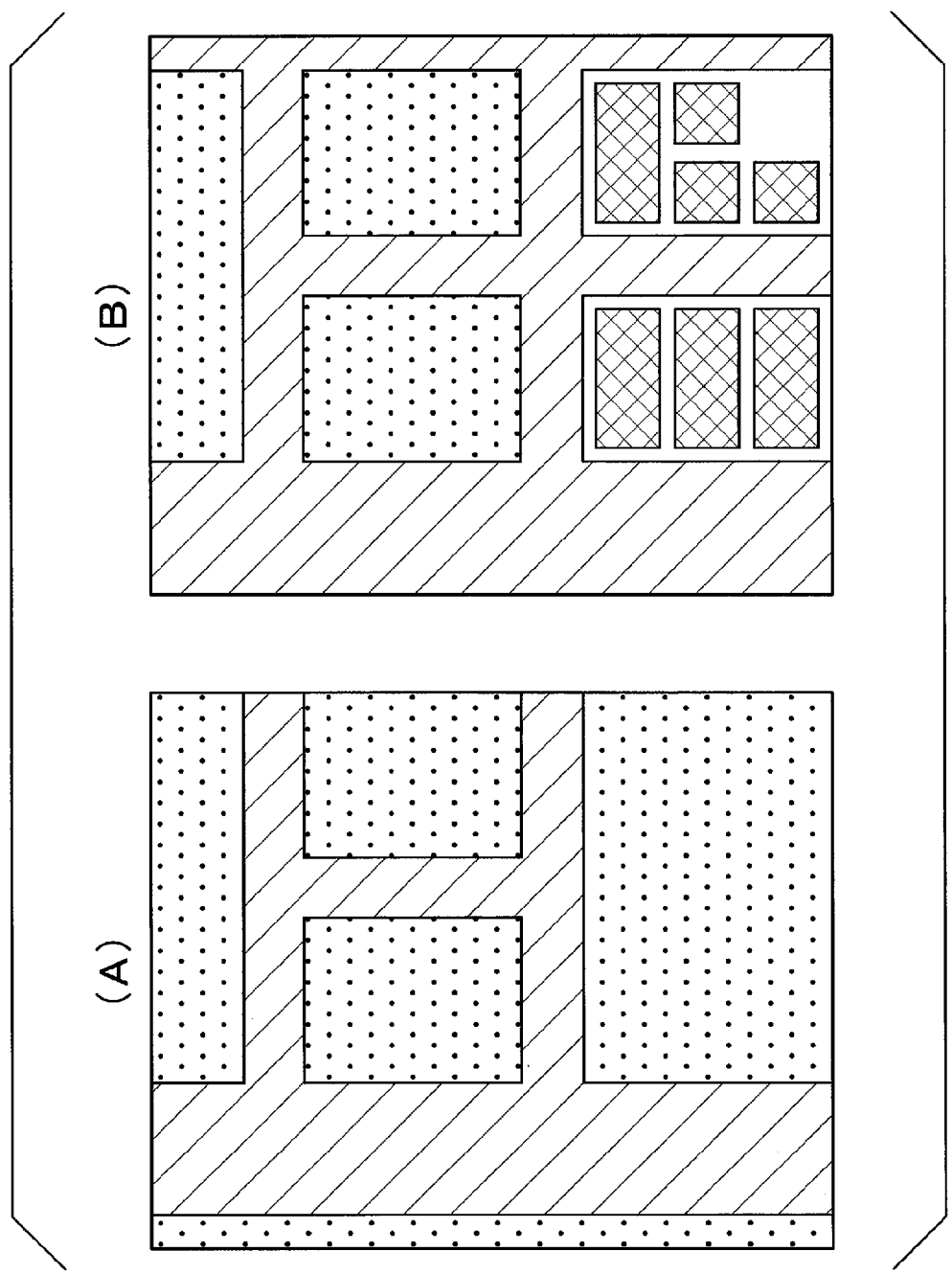
FIG. 9 is a diagram that illustrates specific examples of a first image and a second image in the embodiment.

FIG. 9 is a diagram that illustrates specific examples of the first image and the second image in the embodiment. FIG. 8(A) illustrates the specific example of the first image, and FIG. 8(B) illustrates the specific example of the second image. As described above, the first image is captured in substantially the same time period as the time period of creation of the first map, and the second image is captured in substantially the same time period as the time period of creation of the second map. FIG. 8 illustrates that similar changes to the changes on the maps illustrated in FIG. 7 are also represented in the first image and the second image.

FIG. 10 is a diagram that illustrates specific examples of a first changed region image and a second changed region image in the embodiment. FIG. 10(A) illustrates a result of masking of the first image in FIG. 9(A) by the first difference image in FIG. 8(A), and FIG. 10(B) illustrates a result of masking of the second image in FIG. 9(B) by the second difference image in FIG. 8(B). In a case of this example, in the changed region detection process, the image data of the portion in FIG. 10(A) which is not masked are acquired as the first changed region image data, and the image data of the portion in FIG. 10(B) which is not masked are acquired as the second changed region image data.

The learning data generation device 1 of the embodiment, which is configured in such a manner, generates learning data, which are requested when a device detecting a changed region in an image based on learning results by machine learning is caused to learn presence or absence of a change between images, by using map data that correspond to images as targets of learning. Thus, the learning data generation device 1 of the embodiment may reduce a load of creation of learning data.

Modification Examples

The learning data generation device 1 of the embodiment acquires the image data of the changed region extracted based on the difference in the map data as the learning data. However, the learning data generation device 1 may acquire data, in which a label which indicates presence or absence of a change is added to the extracted image data, as the learning data. Such learning data are acquired, and a load of creation of learning data for supervised learning may thereby be reduced. Meanwhile, the learning data generation device 1 acquires changed region image data, to which no label is added, as the learning data and may thereby reduce a load of creation of learning data for unsupervised learning.

Further, in the above embodiment, an example is described where the learning data generation device 1 uses satellite images as the first image and the second image.

However, the first image and the second image may be other images as long as those correspond to the map data. For example, the first image and the second image may be aerial images or may be images by airborne image capturing by a drone or the like.

Further, in the above embodiment, an example is described where presence or absence, a difference, and so forth of a construction are identified and the changed region on the map is thereby detected. However, objects are not limited to a construction, but objects other than a construction such as a road, a sidewalk, and a park may be used as targets of identification. For example, in a case where polygon data of natural objects such as a sea and a mountain are included in the map data, it is possible to detect a change in the natural objects. In such a manner, polygon data of the target of identification are prepared, and the learning data of the target of identification may thereby be automatically generated.

Further, in the above embodiment, a process for matching the positions of the map data or images is performed, but the process may be omitted in a case where the positions do not have to be matched.

In the configurations described above, the above learning data generation device 1 detects a region which has a change in a pattern between two electronic maps that indicate substantially the same region and have a time series difference.

Further, the learning data generation device 1 acquires images of a real space, which correspond to a detected region and temporally correspond to the two electronic maps respectively, and thereby enables easy extraction of an image in which the real space has not changed yet and an image in which the real space has already changed. The pattern mentioned here is one example of the above visual feature, and the visual feature may be any feature such as a pattern as long as that may be visually recognized.

The learning data generation device 1 in the above-described embodiment may be realized by a computer. In such a case, a program for realizing the functions is recorded in a computer-readable recording medium, the program recorded in the recording medium is read and executed by a computer system, and the functions may thereby be realized. Note that a "computer system" mentioned here includes an OS and hardware such as peripheral apparatuses. Further, the "computer-readable recording medium" is a portable medium such as a flexible disk, a magneto-optical disk, a ROM, or a CD-ROM or a storage device such as a hard disk built in the computer system. In addition, the "computer readable recording medium" may include elements that dynamically retain the program for a short period of time like communication lines in a case where the program is transmitted via a network such as the Internet or a communication wire such as a telephone line and elements that retain the program for a certain period of time such as volatile memories in the computer systems that are servers or clients in the case. Further, the above program may be a program for realizing a portion of the above-described functions, may be a program that realizes the above-described functions in combination with a program already recorded in the computer system, or may be a program that is realized by a programmable logic device such as a field programmable gate array (FPGA).

The embodiment of the present invention has been described with reference to the drawings in the foregoing. However, a specific configuration is not limited to the embodiment, and the present invention includes designs and so forth made without departing from the scope of the gist of the present invention.

INDUSTRIAL APPLICABILITY

The present invention is applicable to a device that generates data for learning used for machine learning.

REFERENCE SIGNS LIST 1 learning data generation device
11 map data storage unit
12 position information storage unit
13 size information storage unit
14 image data storage unit
21 difference map data acquisition unit
22 difference position information acquisition unit
23 difference image generation unit
24 changed region image acquisition unit

The invention claimed is:
1. A learning data generation device comprising:
a processor; and
a storage medium having computer program instructions stored thereon, when executed by the processor, perform to:
  detect a changed region in a space between a first map and a second map based on first map data which indicate the first map and second map data which indicate the second map, wherein the first map represents a first space, wherein the second map represents a second space, wherein the first space and the second space include a common target space, wherein the first space also includes an additional space that isn't present in the second space, and wherein the second map represents the target space at a different time point from the first map;
  acquire images which correspond to the changed region detected from a first image in which the first space represented by the first map is captured and a second image in which the second space represented by the second map is captured;
  acquire first difference position information which indicates a position of the changed region in the first image based on difference map data and first position information which indicates a captured range of the first image;
  acquire second difference position information which indicates a position of the changed region in the second image based on the difference map data and second position information which indicates a captured range of the second image;
  generate a first difference image which represents the target space by the changed region and a region other than the changed region based on the first difference position information, the first difference image having the same size as the first image;
  generate a second difference image which represents the target space by the changed region and a region other than the changed region based on the second difference position information, the second difference image having the same size as the second image;
  extract a first changed region image that corresponds to the changed region from the first image based on the first difference image; and extract a second changed region image that corresponds to the changed region from the second image based on the second difference image.

2. The learning data generation device according to claim 1, wherein the computer program instructions further perform to acquire data that indicate a visual feature of the changed region from the first map data and the second map data.

3. The learning data generation device according to claim 1 or 2, wherein
the first difference image and the second difference image are images in which the changed region is represented by a first value and a region other than the changed region is represented by a second value.

4. The learning data generation device according to claim 1, wherein the computer program instructions further perform to generate data in which image data which indicate the changed region are associated with information which indicates presence or absence of a change in the changed region.

5. A changed region detection method comprising:
a detection step of detecting a changed region in a space between a first map and a second map based on first map data that indicate the first map and second map data that indicate the second map, wherein the first map represents a first space, wherein the second map represents a second space, wherein the first space and the second space include a common target space, wherein the first space also includes an additional space that is not present in the second space, and wherein the second map represents the target space at a different time point from the first map;
a changed region image acquisition step of acquiring images that correspond to the changed region detected in the detection step from a first image in which the first space represented by the first map is captured and a second image in which the second space represented by the second map is captured;
acquiring first difference position information which indicates a position of the changed region in the first image based on difference map data and first position information which indicates a captured range of the first image;
acquiring second difference position information which indicates a position of the changed region in the second image based on the difference map data and second position information which indicates a captured range of the second image;
generating a first difference image which represents the target space by the changed region and a region other than the changed region based on the first difference position information, the first difference image having the same size as the first image;
generating a second difference image which represents the target space by the changed region and a region other than the changed region based on the second difference position information, the second difference image having the same size as the second image;
extracting a first changed region image that corresponds to the changed region from the first image based on the first difference image; and
extracting a second changed region image that corresponds to the changed region from the second image based on the second difference image.

6. The changed region detection method according to claim 5 further comprising acquiring data that indicate a visual feature of the changed region from the first map data and the second map data.

7. The changed region detection method according to claim 5, wherein
the first difference image and the second difference image are images in which the changed region is represented by a first value and a region other than the changed region is represented by a second value.

8. The changed region detection method according to claim 5 further comprising generating data in which image data which indicate the changed region are associated with information which indicates presence or absence of a change in the changed region.

9. A non-transitory computer-readable medium having computer-executable instructions that, upon execution of the instructions by a processor of a computer, cause the computer to execute:
a detection step of detecting a changed region in a space between a first map and a second map based on first map data that indicate the first map and second map data that indicate the second map, wherein the first map represents a first space, wherein the second map represents a second space, wherein the first space and the second space include a common target space, wherein the first space also includes an additional space that is not present in the second space, and wherein the second map represents the target space at a different time point from the first map;
a changed region image acquisition step of acquiring images that correspond to the changed region detected in the detection step from a first image in which the first space represented by the first map is captured and a second image in which the second space represented by the second map is captured;
acquiring first difference position information which indicates a position of the changed region in the first image based on difference map data and first position information which indicates a captured range of the first image;
acquiring second difference position information which indicates a position of the changed region in the second image based on the difference map data and second position information which indicates a captured range of the second image;
generating a first difference image which represents the target space by the changed region and a region other than the changed region based on the first difference position information, the first difference image having the same size as the first image;
generating a second difference image which represents the target space by the changed region and a region other than the changed region based on the second difference position information, the second difference image having the same size as the second image;
extracting a first changed region image that corresponds to the changed region from the first image based on the first difference image; and
extracting a second changed region image that corresponds to the changed region from the second image based on the second difference image.

10. The non-transitory computer-readable medium according to claim 9 wherein the instructions further cause the computer to acquire data that indicate a visual feature of the changed region from the first map data and the second map data.

11. The non-transitory computer-readable medium according to claim 9 wherein the instructions further cause the computer to the first difference image and the second difference image are images in which the changed region is represented by a first value and a region other than the changed region is represented by a second value.

12. The non-transitory computer-readable medium according to claim 9 wherein the instructions further cause the computer to generate data in which image data which indicate the changed region are associated with information which indicates presence or absence of a change in the changed region.

* * * * *